Patented Jan. 20, 1925.

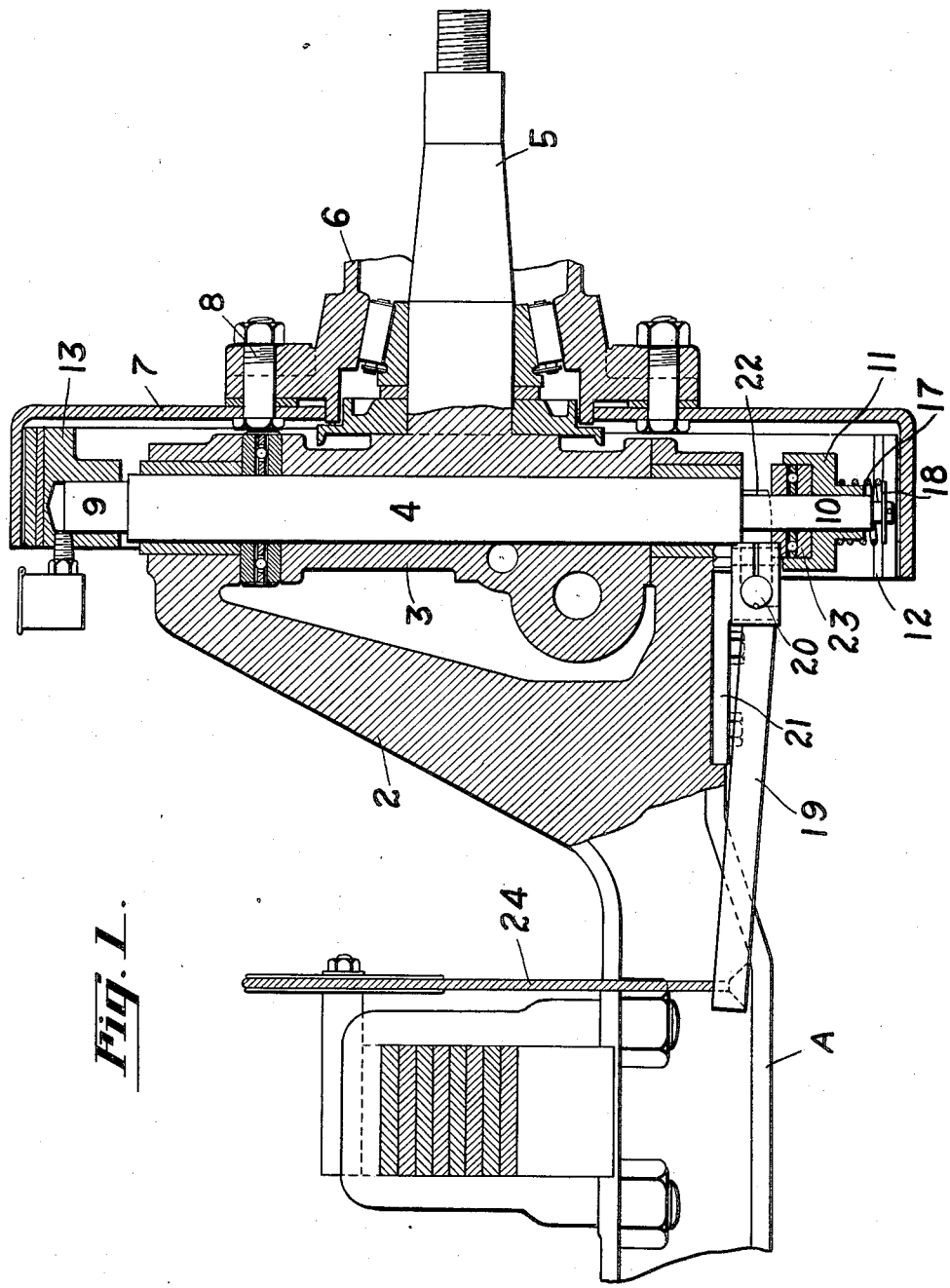

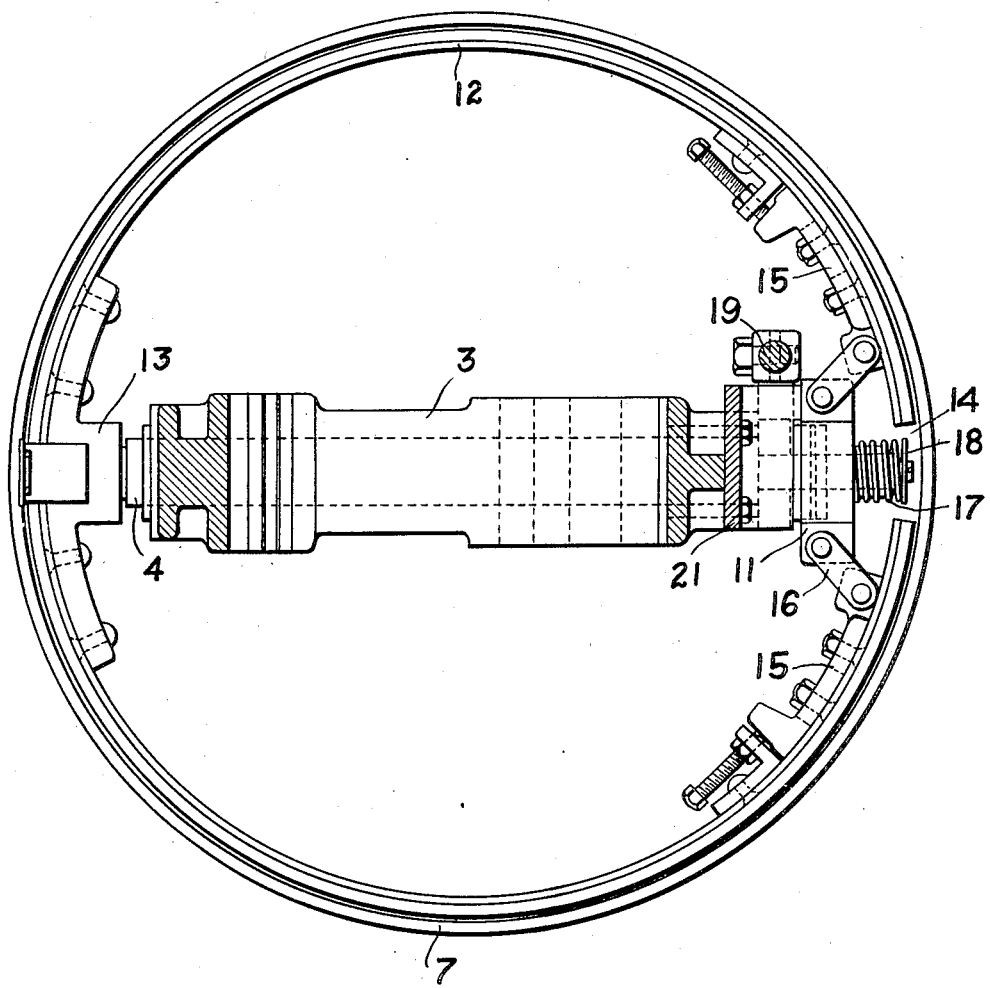

1,523,712

UNITED STATES PATENT OFFICE.

ARCHIE A. PROBEN, OF SAN FRANCISCO, CALIFORNIA, ASSIGNOR OF ONE-THIRD TO ADOLFO DE URIOSTE AND ONE-THIRD TO EDWARD GRUNEISEN, BOTH OF SAN FRANCISCO, CALIFORNIA.

FRONT-WHEEL BRAKE.

Application filed April 23, 1923. Serial No. 633,919.

*To all whom it may concern:*

Be it known that I, ARCHIE A. PROBEN, a citizen of the United States, residing at the city and county of San Francisco and State of California, have invented new and useful Improvements in a Front-Wheel Brake, of which the following is a specification.

This invention relates to brakes, and especially to a front wheel brake for automobiles and like vehicles.

The object of the present invention is to generally improve and simplify the construction and operation of brakes of the character described; to provide a front wheel brake which may be applied to an automobile without materially altering the present conventional construction of the front axle and steering assembly; a front wheel brake which is cheap and simple to manufacture and substantial in construction; a front wheel brake which will not interfere with, or in any way resist, free action of the steering mechanism; a front wheel brake which may be readily connected to operate in unison with the present rear wheel brakes; a front wheel brake which is mounted on and carried by the steering knuckle pin and in which torsional or snubbing strains are transmitted directly through the knuckle pin and the axle. Further objects will hereinafter appear.

One form which my invention may assume is exemplified in the following description and illustrated in the accompanying drawings, in which—

Fig. 1 is a front elevation of one end of an automobile axle, said view being partially in section and showing the application of the invention.

Fig. 2 is a side elevation of the brake drum, showing the position of the brake band and the mechanism whereby it is actuated.

Referring to the drawings in detail, and particularly to Fig. 1, A indicates the front axle of an automobile, 2 the forked end of the same, 3 the steering knuckle, 4 the spindle or pin about which the knuckle turns, 5 the wheel spindle, 6 a portion of the hub of the front wheel, and 7 a brake drum secured to the inner end of the hub by means of bolts 8 or other similar means.

The steering knuckle spindle or pin is in this instance extended both at the upper and lower ends, first to form a snubbing post, as indicated at 9, and secondly, as at 10, to form a guide for an expanding block 11, hereinafter to be referred to.

The brake band proper, generally indicated at 12, is secured at its upper end to a bearing member 13 which is carried by the snubbing post 9, being vertically movable thereon when the brake band is expanded or retracted as the case may be. The lower end of the brake band is split, as indicated at 14; the opposite ends of the split being provided with take-up shoes 15, which are adjustable and through which wear may be taken up from time to time. The shoes are connected to the expanding block 11 by means of links 16. These links are arranged in toggle formation and form pivotal connections at their opposite ends, first being pivotally connected to the expanding block, and secondly being pivotally connected to the take-up shoes 15.

Means are employed for transmitting a vertical movement to the expanding block; automatic movement being imparted by means of a spring 17 interposed between the expanding block and a washer or collar 18 secured on the lower end of the spindle pin extension 10. This pin normally exerts an upward pressure and this pressure causes a contracting movement to be exerted on the free ends of the brake band; that is, upward movement of the expanding block exerts a pull on the toggle link 16. This pull contracts the split portion of the brake band, thereby automatically releasing the brake and normally maintaining the same in a released condition. The upper portion of the brake band carried by the bearing member 13 simultaneously and automatically releases itself as the bearing member settles by gravity on the snubbing post 9 when the lower or split portion of the band is contracted. Simultaneous and uniform release is thus obtained and dragging of the brake band with relation to the drum should be prevented, if proper adjustments are maintained. Manually actuated means are employed for the purpose of expanding the brake band or, in other words, applying the brake. The manual means consists of a rocker arm 19 pivotally mounted as at 20 in a bracket 21 secured to the underside of the axle. One end of the rocker arm engages the upper side of the expanding block, as indicated at 22. A thrust bearing 23 is, however, interposed between the rocker arm and the expanding block and movement is, therefore, imparted to the expanding block through the medium of the thrust bearing. This is essential as resistance to free operation of the steering mechanism is in this manner avoided. The opposite end of the rocker arm is extended and is connected through means of a cable 24 with a suitable lever or the like whereby a pull may be exerted, that is, the opposite end of the cable may be connected with the foot pedal of the service brake and the front wheel brakes will thus be simultaneously applied when the rear service brakes are applied.

From the foregoing description it can be seen that a brake constructed as here illustrated may be readily applied to an automobile without materially altering the present conventional construction of the front axle and steering assembly; that is, the only practical alteration required would be the substitution of one steering knuckle spindle pin for another; that is, the present brake requires a spindle pin with extensions such as shown at 9 and 10; these extensions being essential as they do not only serve the function of supporting the braking mechanism, but the extension 9 also serves the function of taking up torsional or snubbing strains when the brake is applied. The axle requires no alterations as the bracket 21 is merely bolted to the underside thereof. The brake does not interfere with the steering mechanism as no resistance is offered the turning movement of the wheels, due to the use of the thrust bearing indicated at 23. The steering mechanism can, therefore, be readily operated regardless of whether the brake is applied or released. The entire steering mechanism is accessible from the inside and as such permits ready adjustment and taking up of the brake bands as they wear.

The brake mechanism is manually applied and is automatically released, the automatic release being maintained by tension of the spring 17. The entire weight of the brake mechanism is carried by the steering knuckle spindle pin. The expanding block is guided by the extension 10, and as the rocker arm is designed to apply an equal pressure, uniform expansion of the brake band is insured, and as all parts may be constructed as large as desired, wear should be reduced to a minimum and the life and general utility of the mechanism will, therefore, be extended.

While certain features of the present invention are more or less specifically illustrated, I wish it understood that various changes in form and proportion may be resorted to within the scope of the appended claims, similarly that the materials and finish of the several parts employed may be such as the experience and judgment of the manufacturer may dictate or various uses may demand.

Having thus described my invention, what I claim and desire to secure by Letters Patent is—

1. The combination with a vehicle wheel and a brake drum rigidly secured thereto, a steering knuckle having an axle spindle about which the wheel rotates, an axle having a forked end, a pin extending through the fork and knuckle and forming a pivot for the knuckle, an open-ended internally expanding brake band mounted in the drum, a snubbing post forming an extension of the upper end of the knuckle pin, a bearing member vertically slidable thereon, the brake band being secured to said member and being supported thereby, an expanding block vertically slidable on an extension formed on the lower end of the knuckle pin, toggle links forming a connection between said block and the open ends of the brake band, means permitting endwise adjustment of the open ends of the brake band with relation to said links, means engageable with the block for automatically and normally retaining the same in a position where the brake band will assume a contracted position, and manually actuated means engageable with the expanding block to move the same to a position where the brake band will be expanded.

2. The combination with a vehicle wheel and a brake drum rigidly secured thereto, a steering knuckle having an axle spindle about which the wheel rotates, an axle having a forked end, a pin extending through the fork and knuckle and forming a pivot for the knuckle, an open-ended internally expanding brake band mounted in the drum, a snubbing post forming an extension of the upper end of the knuckle pin, a bearing member vertically slidable thereon, the brake band being secured to said member and being supported thereby, a single spring carried by the knuckle pin for automatically retaining the brake band in a contracted position, and manually actuated means for expanding the brake band.

3. The combination with a vehicle wheel and a brake drum rigidly secured thereto, a steering knuckle having an axle spindle about which the wheel rotates, an axle having a forked end, a pin extending through the fork and knuckle and forming a pivot for the knuckle, an open-ended internally expanding brake band mounted in the drum, a snubbing post forming an extension of the upper end of the knuckle pin, a bearing member vertically slidable thereon, the brake band being secured to said member and being supported thereby, an expanding block vertically slidable on an extension formed on the lower end of the knuckle pin, toggle links forming a connection between said block and the open ends of the brake band, means engageable with the block for automatically and normally retaining the same in a position where the brake band will assume a contracted position, and manually actuated means engageable with the expanding block to move the same to a position where the brake band will be expanded.

4. The combination with a vehicle wheel and a brake drum rigidly secured thereto, a steering knuckle having an axle spindle about which the wheel rotates, an axle having a forked end, a pin extending through the fork and knuckle and forming a pivot for the knuckle, an open-ended, internally expanding brake band mounted in the drum, a snubbing post forming an extension of the upper end of the knuckle pin, a bearing member vertically slidable thereon, the brake band being secured to said member and being supported thereby, an expanding block vertically slidable on an extension formed on the lower end of the knuckle pin, toggle links forming a connection between said block and the open ends of the brake band, a spring carried by the lower knuckle pin extension and engaging the underside of the expanding block to hold it in an elevated position where the toggle links will exert a pull to contract the brake band, an anti-friction thrust bearing disposed on top of the block, a rocker arm pivotally secured to the forked axle, one end of said arm engaging the top of the anti-friction thrust bearing, and means for exerting a pull on the opposite end of the rocker arm.

ARCHIE A. PROBEN.